United States Patent [19]
Chow

[11] Patent Number: 5,510,098
[45] Date of Patent: Apr. 23, 1996

[54] CVD METHOD OF PRODUCING AND DOPING FULLERENES

[75] Inventor: Lee Chow, Orlando, Fla.

[73] Assignee: University of Central Florida, Orlando, Fla.

[21] Appl. No.: 176,543

[22] Filed: Jan. 3, 1994

[51] Int. Cl.$^6$ ................................................. C01B 31/00
[52] U.S. Cl. ...................... 423/445 B; 423/446; 423/262; 423/263; 423/439
[58] Field of Search ................................ 423/446, 445 B, 423/262, 263, 439

[56] References Cited

U.S. PATENT DOCUMENTS

| | | | |
|---|---|---|---|
| 4,221,608 | 9/1980 | Beckman | 106/307 |
| 4,849,199 | 7/1989 | Pinneo | 423/446 |
| 5,108,779 | 4/1992 | Gasworth | 423/446 |
| 5,132,105 | 7/1992 | Remo | 423/446 |
| 5,196,396 | 3/1993 | Lieber | 505/1 |
| 5,209,812 | 5/1993 | Wu et al. | 423/446 |
| 5,223,479 | 6/1993 | McCauley, Jr. et al. | 505/1 |
| 5,227,038 | 7/1993 | Smalley et al. | 204/173 |
| 5,239,820 | 8/1993 | Leifer et al. | 60/202 |
| 5,273,731 | 12/1993 | Anthony et al. | 423/446 |

FOREIGN PATENT DOCUMENTS

| | | | |
|---|---|---|---|
| 2091665 | 10/1993 | Canada | 423/445 B |
| WO92/20622 | 11/1992 | WIPO | C01B 31/00 |

OTHER PUBLICATIONS

Dai, G., et al. "A New Technique for Synthesizing Fullerene C60", in 'Gaoden Xuexiao Huaxve Xueba', vol. 13, #7 (1992), pp. 893–894.

Chemical Abstracts, vol. 118, #237042d (1993).

Patent Abstracts of Japan, vol. 17, #259, (C–1061), May 21, 1993, abstract for Sumino, JP–05–4810 (14 Jan. 1993).

Powell, C. F., et al. "Vapor–plating: The Formation of Coatings by Vapor Deposition Techniques", John Wiley: New York, 1955, pp. 1–13 and 71.

Howard et al., Fullerenes C60 and C70 in flames, Nature, vol. 352 Jul. 11, 1991.

Kratschmer et al., Solid C60: a new form of carbon, Nature, vol. 347, Sep. 27, 1990, pp. 354–358.

Kroto et al., C60: Buckminsterfullerene, Nature, vol. 318, Nov. 15, 1985, pp. 162–163.

McKinnon et al., Combustion Synthesis of Fullerenes, Combustion And Flame 88: 1992, pp. 102–112.

*Primary Examiner*—Michael Lewis
*Assistant Examiner*—Peter T. DiMauro
*Attorney, Agent, or Firm*—Brian S. Steinberger

[57] ABSTRACT

Methods of producing fullerenes in large-macroscopic quantities inexpensively is disclosed without using solid carbon material such as graphite. In a preferred embodiment, fullerenes are formed by a hot filament CVD procedure. The fullerenes occur in the soot that forms as a by-product on the edges of the substrate holder. Mass spectrum of soot deposits shows lines corresponding to $C_{60}$. From the typical concentrations of gaseous species in the diamond-growing CVD chamber, hydrocarbon species including $CH_3$ or $C_2H_2$ can be the precursors for the formation of fullerenes in the CVD chamber. A method of using fullerenes to enhance the properties of rubber composites is also described.

15 Claims, 3 Drawing Sheets

CVD METHOD OF PRODUCING AND DOPING FULLERENES

This invention relates to fullerenes, and in particular to producing and doping fullerenes by a hot filament CVD method and a method for utilizing fullerenes as a rubber reinforcement agent.

BACKGROUND AND PRIOR ART

Fullerenes consist of 60 carbon atoms bonded together and were the first molecule synthesized that had a perfect spherical shape. Fullerenes were first discovered in 1985. Uses for fullerenes are expanding into many areas. For example, alkali metal-doped $C_{60}$ are high temperature superconductors with temperature ranging from 10° K. to 35° K. $C_{60}$ has shown to have strong optical limiting properties. Under high pressure, $C_{60}$ transforms into diamonds. Ion bombarded fullerenes can increase the nucleation of CVD diamond by 10 orders of magnitude.

A problem with some known processes are that some are limited to producing only several grams of $C_{60}/C_{70}$ mixture per day and require value-added products such as graphite. Under the carbon arc method, carbon is vaporized with the heat from an electrical arc, fullerene molecules along with graphite carbon molecules are then condensed and collected as solid soot material. The fullerenes can then be purified by extracting the soot with an appropriate solvent followed by evaporation of the solvent to yield the solid fullerene material. U.S. Pat. No. 5,227,038 to Smalley et al. describes such a method. Fullerenes have also been made by a process involving vaporizing carbon from a rotating disk of graphite into a helium flow using a focussed laser since 1985, as described by Kroto et at. in an article entitled "$C_{60}$: Buckminsteffullerene", Nature, vol. 318, Nov. 14, 1985, pages 162–163.

SUMMARY OF THE INVENTION

The first objective of the present invention is to provide a method of producing fullerenes using a Chemical Vapor Deposidon(CVD) method.

The second object of this invention is to provide a method of producing fullerenes without using value-added products such as graphite.

The third object of this invention is to provide a method of producing fullerenes inexpensively in large-macroscopic quantities.

In a preferred embodiment, fullerenes are formed during diamond synthesis by a hot filament CVD procedure. In this CVD procedure, $H_2$ and carbon-containing gas (i.e. $CH_4$ or $C_2H_2$) are admitted into a growth chamber. The pressure inside the growth chamber is controlled by the pumping rate through a valve, and the flow rate of the carbon-containing gases. The preferred range of pressure is approximately 30–100 torr. A pressure of approximately 10–1000 torr. will be adequate. A tungsten wire filament is heated by an alternating(at) or direct(dc) current supply to about 1800°–2200° C. A substrate (typically Si, or other refractory metals such as W or Ta) is situated near the wire filament. The substrate temperature can be maintained at 900° to 1000° C. by adjusting the distance between the substrate and the filament. Through the interaction of the hydrocarbon molecules with the heated filament, diamond was deposited on the Si substrate. At the same time, fullerenes occurred in the soot that formed as a by-product on the edges of the substrate holder at locations where the temperature does not favor diamond deposition. Mass spectrum of graphed soot deposits retrieved from the chamber shows lines corresponding to fullerenes, $C_{60}$.

A method of using fullerenes as a rubber reinforcement agent to enhance rubber properties such as tensile strength, wear and tear resistance is also disclosed.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Method for Producing and Doping Fullerenes

Figure 1:
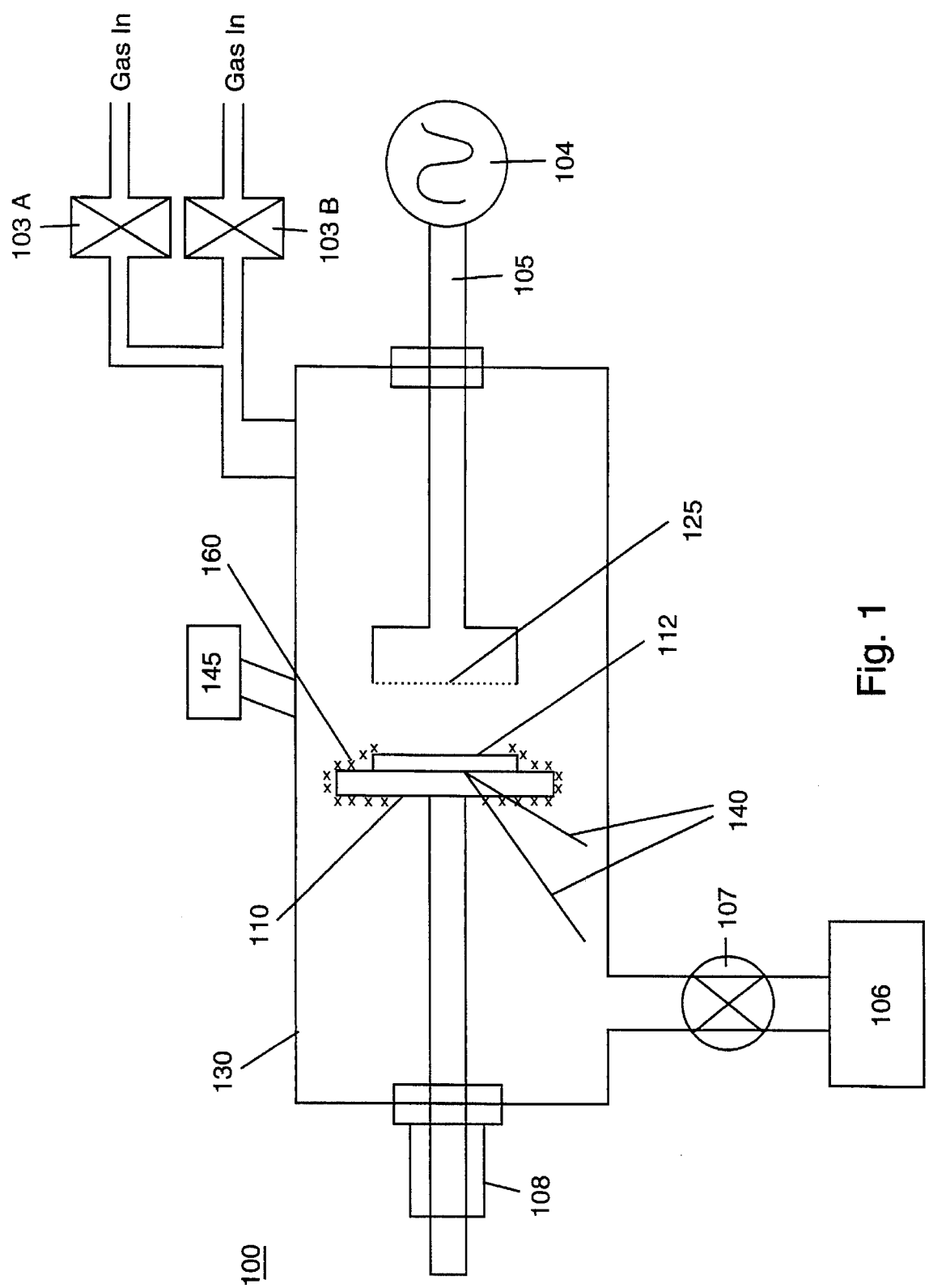
FIG. 1 illustrates an apparatus and method of producing fullerenes by Hot Filament CVD.

FIG. 1 illustrates an apparatus 100 for producing fullerenes by Hot Filament Chemical Vapor Deposition-(CVD) method. In FIG. 1, experiments were performed in a conventional hot filament CVD chamber 130 using an approximately straight 0.75-mm diameter tungsten filament 125 approximately 7 cm long. The current from power supply 104 was maintained at approximately 55 A, and the filament temperature was estimated to be approximately 2200 degrees C. Gases from inlets 103A and 103B were feed into chamber 130. The gases were approximately 99.8% pure $CH_4$ mixed with approximately 99.999% pure $H_2$. The pressure inside the chamber was maintained between approximately 30–60 torr using a vacuum pump 106 and a variable valve 107. The flow rate was controlled at approximately 0.4 sccm for $CH_4$ and approximately 99.6 sccm for $H_2$. A stainless steel substrate holder 110 was used, and a scratched Si wafer 112 was used as the substrate. The substrate temperature, monitored by both thermocouple 140 and pyrometer 145 was kept between approximately 900° to approximately 950° C. This temperature is maintained by adjusting the distance between substrate 112 and filament 125 using a translational stage 108. A typical run lasted approximately 5 to approximately 20 hours. After each diamond deposition, soot 160 was collected from the substrate holder 110. Approximately 5 to 20 mg of soot was collected from each run.

The collected soot was analyzed by mass spectrometry without further treatment. A mass spectrometer generally uses either thermal energy or electron impact or laser energy to dissociate carbon molecules from the soot. With these energy source methods, the carbon molecules are ionized and accelerated by an electrostatic field. The ions are detected at a fixed distance. The arrival time will be proportional to the mass per charge ratio(m/e).

Figure 2:
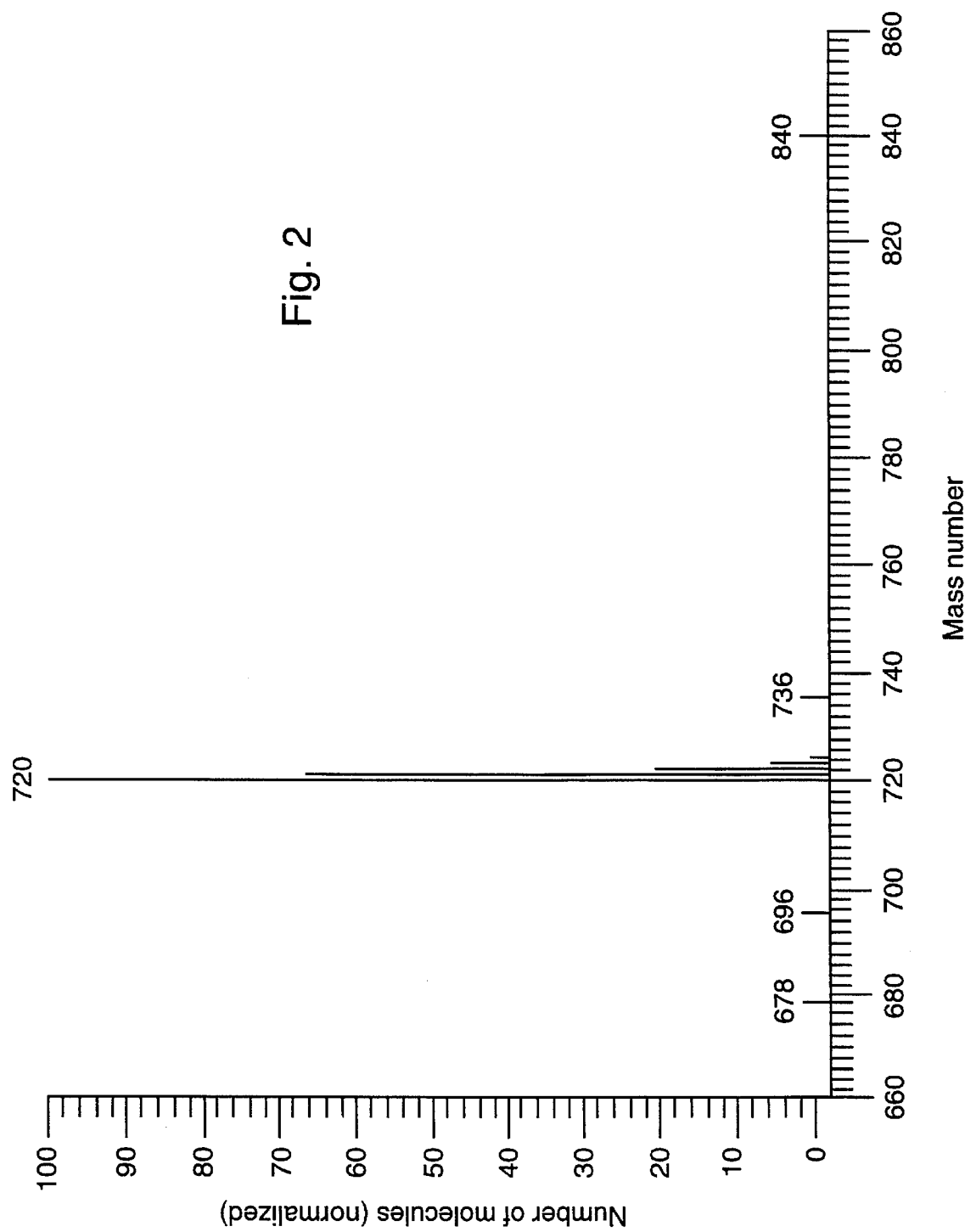
FIG. 2 shows a mass spectrum of the soot collected in the CVD chamber.

FIG. 2 shows a mass spectrum of the soot collected in the CVD chamber 130 of FIG. 1 in a graph showing the number of molecules detected verses mass-to-charge ratio(m/e). The signal at a mass-to-charge of approximately 720 in FIG. 2 indicates the presence of $C_{60}$. In order to increase the yield of fullerenes-containing soot, growth conditions were modified to approximately 1 to 2% $CH_4$+approximately 98 to 99% $H_2$. Further, the substrate holder 110 was kept at a lower temperature of approximately 400° to 750° C. by moving substrate holder 110 away from the filament 125. This way, soot could be produced at an approximate rate of 10 to 20 mg/hr.

The Hot Filament CVD method for producing fullerenes in a chamber differs from both prior art laser vaporization or carbon-arc methods of producing fullerenes. Under typical diamond-forming conditions of approximately 30 to 80 torr for approximately 0.5% $CH_4$+99.5% $H_2$ and a filament temperature of approximately 1800° to 2200° C., the atomic carbon concentration in the CVD chamber 130 is several orders of magnitude lower than most hydrocarbon species in the growth chamber. It is generally accepted that the hydrocarbon species like acetylene or methyl radicals rather than carbon atoms are the growth species in the diamond thin film growth. Therefore the $C_{60}$ found in the CVD chamber 130 is believed to come from hydrocarbon precursors. This agrees with the findings of fullerenes production in hydrocarbon flames.

The formation of fullerenes from hydrocarbon species like $CH_2$, $CH_4$, and $CH_3$ is a complex subject. It is conceivable that hydrocarbon molecules first form small polycyclic aromatic hydrocarbons(PAH). The addition of further hydrocarbon species is aided through the abundance of atomic hydrogen in CVD chamber 130, where hydrogen abstraction can create dangling bonds in the PAH clusters as well as in the hydrocarbon species. The observation of PAH molecules in the fullerenes-containing soot 160 confirms this hypothesis.

Additives also can be admitted through the valve 103 into the CVD chamber 130 to endohedrally dope the fullerene. It has been shown in the past that He, Ne, Ar, La, Ni, Na, Rb, Cs can be enclosed in the $C_{60}$ cage to form endohedral fullerites. In addition, endohedral complexes with small polar molecules like CaCl, CeCl, NaCl, and NaI have been reported.

Figure 3:
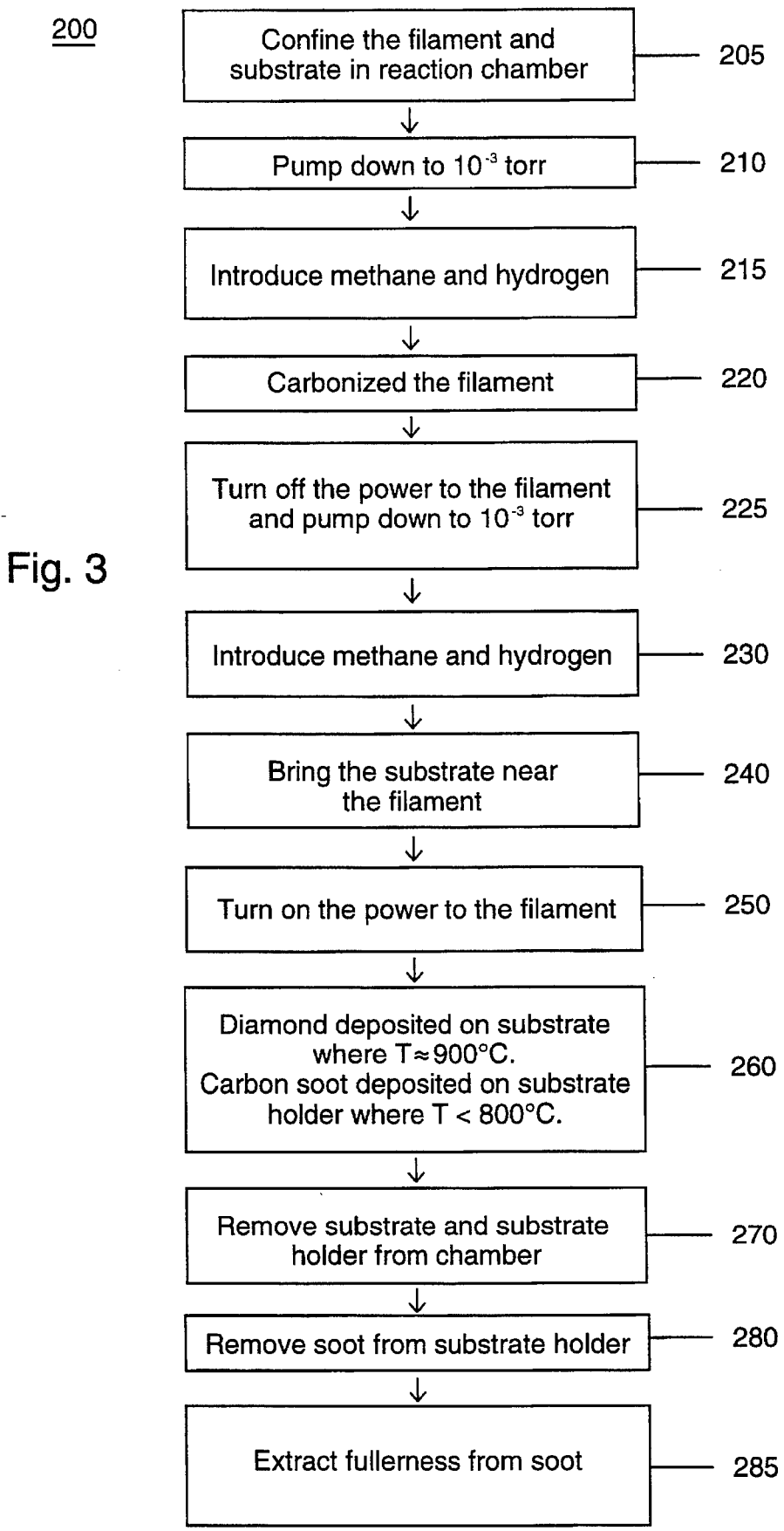
FIG. 3 illustrates a flow chart for the hot filament CVD method for fullerenes synthesis.

A method of producing fullerenes will now be discussed with reference to FIG. 3. FIG. 3 illustrates a flow chart 200 for the hot filament CVD method for fullerenes synthesis in relation to the model 100 shown in FIG. 1. Referring to both FIG. 1 and 3, the first step can be to confine the filament 125 and silicon substrate 112 in reaction chamber 130. Next, at 210 pump 106 and valve 107 can be used to pump down chamber 130 to $10^{-3}$ torr. Next, at 215, methane and hydrogen gases can be introduced through inlets 103A and 103B into chamber 130. Next, at 220 filament 112 can be carbonized with current from power supply 104 through high current feed through 105 which is maintained at approximately 55 A. Next, at 225 power 104 is turned off to the filament 125 and with pump 106 and valve 107 pump down the chamber 130 to $10^{-3}$ torr. Next, at 230 methane and hydrogen gas is introduced through inlets 103A and 103B into chamber 130. Next, at 240 substrate 112 is brought near to the filament 125. Next, at 250 power supply 104 is turned on to the filament 125. At 260, diamond is deposited on substrate 112 where T is approximately 900° C. Carbon soot 160 becomes deposited on substrate holder 110 when T is less than 800° C. Next, at 270 substrate 112 and substrate holder 110 are removed from chamber 130. Next, at 280 soot 160 is removed from substrate holder 110. Finally at 285 FIG. 3, fullerenes can be extracted from soot 160.

A Method of Using Fullerenes to Enhance Rubber Composites

The improvement of the properties of rubber or rubber composites such as those which can be used in tires, gaskets, belts and boots, etc., can be achieved by adding reinforcement agents such as oil, carbon black and/or other chemical compounds. The rubber properties that can be improved include but are not limited to (1) tensile strength, (2) wear resistance, and (3) tear resistance. U.S. Pat. No. 4,221,608 to Beckman, which is incorporated by reference, describes a method for mixing carbon black powder type particles, gases or liquid combined with or without oil as a rubber reinforcing agent. This agent is mixed with elastomer type materials to form rubber composites with some enhancement of the rubber properties.

The improvements having the addition of carbon black are mainly governed by the particle size (specific surface area) and structure of the carbon black. In particular, the smaller the particle size, the better the reinforcement. The lower limit of significant reinforcement with carbon black is about $6m^2/cm^3$ of specific surface area (or 1 micron in diameter), and the upper limit of useful specific surface is of the order of 300–400 $m^2/cm^3$ ( approximately 0.015 micron in diameter), which is set by considerations of dispersibility and processability of the mix. Thus, hypothetically the inventor here has determined that these upper limits can be increased with the addition of different carbon compounds by modifying the dispersibility and processability of the mix.

The recent discovery of fullerenes with a molecular size of 10.2 Å, such as the type produced by the hot filament CVD method described above, presents an increase of surface area of more than a thousand-fold as compared with typical carbon black used as a rubber reinforcement. Again, fullerenes are a form of carbon as represented as $C_{60}$. The potential of the large surface areas using fullerenes can be tapped by modifying the dispersiblity and processability of the mix, accordingly. Thus, fullerenes could be used by themselves or in a mixture type combination with other agents such as elastomers, rubber, oil, carbon black, etc. to form a rubber reinforcing agent. Rubber composites using carbon black can have an increase in tensile strength from approximately 1150 pounds to over 10,000 pounds. The surface area of the larger fullerenes in $m^2/cm^3$ varying from $C_{70}$, $C_{84}$, $C_{240}$, $C_{540}$, up to $C_{960}$, could approach the tensile strength rubber reinforcement ranges obtained with carbon black.

The parameters, materials, units and components used referred above were for exemplary reasons and can be modified for similar desired results for producing fullerenes.

The method of producing fullerenes described above is not limited to producing only $C_{60}$, but can include fullerene sizes of $C_{70}$, $C_{84}$, $C_{240}$, $C_{540}$, up to $C_{960}$, While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method of producing fullerenes using an electrically heated metal filament to deposit soot containing fullerenes on a substrate within a Chemical Vapor Deposition chamber, comprising the steps of:

(a) feeding and mixing, under fullerene growth conditions to increase the yield of fullerenes-containing soot, approximately 0.5 to 2% $CH_4$ gas with approximately 98 to 99.5% $H_2$ gas into a Chemical Vapor Deposition chamber containing a substrate and a metal filament;

(b) raising the temperature of the metal filament in the chamber to approximately 2200 degrees C.;

(c) maintaining the temperature of the substrate to be between approximately 900 to 950 degrees C.;

(d) collecting soot from the substrate in the chamber; and (e) extracting fullerenes from the collected soot.

2. The method of producing fullerenes of claim 1, wherein the filament is approximately 0.5 to 1.0 mm tungsten wire.

3. The method of producing fullerenes of claim 1, wherein the providing step further includes maintaining current between approximately 30 to 100 A to the filament.

4. The method of producing fullerenes of claim 1, further including the step of:

evacuating the chamber.

5. The method of producing fullerenes of claim 4, wherein the chamber is evacuated between:

approximately 30 to approximately 60 torr.

6. The method of producing fullerenes of claim 1, wherein the step of maintaining includes:

moving the substrate relative to the filament.

7. The method of producing fullerenes of claim 1, wherein the step of removing further includes:

removing soot from a substrate holder in the chamber.

8. The method of producing fullerenes of claim 1, wherein the step of feeding further includes:

adding at least one additive gas chosen from at least one of:

He, Ne, Ar, La, Ni, Na, Rb, and Cs.

9. A method of producing fullerenes using an electrically heated metal filament and a substrate within a Chemical Vapor Deposition chamber, comprising the steps of:

(a) providing a current maintained at approximately 30 to 100 A to a tungsten filament within a Chemical Vapor Deposition chamber;

(b) feeding and mixing, under fullerene growth conditions to increase the yield of fullerenes-containing soot, approximately 0.5 to 2% $CH_4$ gas and approximately 98 to 99.5% $H_2$ gas to the chamber;

(c) maintaining the temperature of a silicon substrate in the chamber to be approximately 900 to 950 degrees C.;

(d) collecting soot from the substrate in the chamber; and (e) extracting fullerenes from the collected soot.

10. The method of producing fullerenes of claim 9, wherein the tungsten filament is approximately 0.5 to 1.0 mm wire.

11. The method of producing fullerenes of claim 9, further including the step of:

evacuating the chamber.

12. The method of producing fullerenes of claim 11, wherein the chamber is evacuated between:

approximately 30 to approximately 60 torr.

13. The method of producing fullerenes of claim 9, wherein the step of maintaining further includes:

moving the substrate relative to the filament to adjust the temperature of the filament.

14. The method of producing fullerenes of claim 9, wherein the step of removing further includes:

removing soot from a substrate holder in the chamber.

15. The method of producing fullerenes of claim 9, wherein the step of feeding further includes:

adding additive gases chosen from at least one of:

He, Ne, Ar, La, Ni, Na, Rb, and Cs.

* * * * *